United States Patent
Tsengas

(10) Patent No.: US 8,061,301 B1
(45) Date of Patent: Nov. 22, 2011

(54) METHOD AND APPARATUS FOR REDUCING MALICIOUS ODORS FROM A CAT LITTER RECEPTACLE

(75) Inventor: Steven Tsengas, Fairport Harbor, OH (US)

(73) Assignee: OurPet's Co., Fairport Harbor, OH (US)

( * ) Notice: Subject to any disclaimer, the term of this patent is extended or adjusted under 35 U.S.C. 154(b) by 272 days.

(21) Appl. No.: 12/388,746

(22) Filed: Feb. 19, 2009

Related U.S. Application Data

(63) Continuation-in-part of application No. 11/396,443, filed on Apr. 3, 2006, now abandoned.

(60) Provisional application No. 60/670,498, filed on Apr. 11, 2005.

(51) Int. Cl.
*A01K 1/035* (2006.01)
*A01K 19/00* (2006.01)

(52) U.S. Cl. ............... 119/166; 96/135; 96/154

(58) Field of Classification Search ............ 96/108, 96/134, 135, 154; 119/165, 166, 419; 422/120, 422/122
See application file for complete search history.

(56) References Cited

U.S. PATENT DOCUMENTS

| | | | | |
|---|---|---|---|---|
| 3,428,026 A | * | 2/1969 | Sohmers et al. | 119/452 |
| 3,861,894 A | | 1/1975 | Marsh | |
| 3,872,832 A | * | 3/1975 | Quinn | 119/165 |
| 4,046,939 A | * | 9/1977 | Hart | 95/142 |
| 4,793,837 A | * | 12/1988 | Pontius | 502/62 |
| 5,174,462 A | * | 12/1992 | Hames | 220/87.1 |
| 5,224,975 A | * | 7/1993 | Purnell et al. | 96/108 |
| 5,564,364 A | * | 10/1996 | Kovacs et al. | 119/163 |
| 5,624,478 A | * | 4/1997 | Patapanian et al. | 96/108 |
| 5,772,738 A | | 6/1998 | Muraoka | |
| 5,778,822 A | * | 7/1998 | Giffin et al. | 119/165 |
| 6,341,579 B1 | * | 1/2002 | Alkire et al. | 119/165 |
| 6,945,193 B1 | * | 9/2005 | Tanner et al. | 119/165 |
| 7,490,578 B1 | * | 2/2009 | Mottard | 119/161 |
| 2002/0088346 A1 | | 7/2002 | Baracchi et al. | |

* cited by examiner

*Primary Examiner* — Frank Lawrence, Jr.
(74) *Attorney, Agent, or Firm* — John D. Gugliotta, PE, Esq

(57) ABSTRACT

An air filter assembly is provide in conjunction with a cat litter receptacle that includes a supporting structure for a filter element. The filter element is formed of a porous structure incorporating activated ingredients specifically adapted for deodorizing unpleasant odors. The activated ingredients include activated carbon, carbon fiber, and zeolite, as well as combinations of carbon and zeolite.

7 Claims, 5 Drawing Sheets

METHOD AND APPARATUS FOR REDUCING MALICIOUS ODORS FROM A CAT LITTER RECEPTACLE

RELATED APPLICATIONS

The present application is continuation in part of U.S. Ser. No. 11/396,443 filed on Apr. 3, 2006 now abandoned, which claimed the benefit of U.S. Provisional Application 60/670,498 filed on Apr. 11, 2005. The entire disclosure and contents of the above applications are hereby incorporated by reference.

BACKGROUND OF THE INVENTION

1. Field of the Invention

The present invention relates generally to cat litter receptacle and air filters, and, more particularly, to an air filter assembly having carbon fibers interwoven as a fabric or membrane for reducing malicious odors from a cat litter receptacle.

2. Description of the Related Art

Cats, which are among the most popular types of domestic pets, are usually trained to use a litter box for elimination of both liquid and solid wastes. A cat litter box is normally made of a re-useable plastic or like material. Such a material does not allow a cat's urine to leak through the box, while at the same time provides an efficient, cleanable and reusable waste container. Most cat owners take appropriate action to discard the litter from a cat litter box after an appreciable period of time, often several days. On the other hand, even before the litter has been thoroughly saturated with wastes from the cat or cats that use it, a cat may be inclined to push some of the litter out of the box, particularly if the odor is strong. In any event, the person using a cat litter box, usually the owner of the cat or cats, may find the task of emptying the cat litter to be personally obnoxious.

A solution to this chore has been developed in a self-scooping litter box that operates by means of a single motorized driving mechanism. Sold by OurPet's® Company under the name Smart Scoop®, a motorized scooping device is actuated by a sensor after the cat leaves the litter box. A lid on the waste drawer opens so that clumped waste can access a tray, and a cleaning carriage travels along the pan, retrieves the waste clumps from the litter as tines on a pivoting grate pass through the litter, with the clumped litter lifted mechanical shoveled into the covered tray behind it. The grate returns to its original position and the cleaning carriage travels back to its resting position. The lid closes on the drawer so as to cover the malicious odors caused by the waste held within until the pet owner returns to lift the tray, by means of its handle, and discard the waste. The tray can be turned upside to discard the waste or the plastic covering can be removed with the waste held therein and the both discarded.

With the clumped litter accumulating into a removable receiving tray, a source of noxious or malicious odors is accumulated. Many air filters are available for filtering odors from the air. However, none appear adapted for or adaptable to reducing malicious odors from a cat litter receptacle.

Consequently, there appears to be a need for air filters with a carbon fiber structure, especially in conjunction with an integration means for housing the filter within the litter box waste receptacle. There also appears to be a need for an air filter system that would operate as a substitute and replacement for existing air filter systems. The present invention, as described in the several embodiments provided below, fulfills these needs.

SUMMARY OF THE INVENTION

It is therefore an object of the present invention to provide an improved carbon fiber odor filter for reducing malicious odors from a cat liter receptacle.

It is a feature of the present invention to provide an improved carbon fiber odor filter that utilizes open cell foam as a carrier for a carbon adsorbent means.

Briefly described according to the preferred embodiment of the present invention, an air filter assembly is provide in conjunction with a cat litter receptacle that includes a supporting structure for a filter element. The filter element is formed of a porous structure incorporating activated ingredients specifically adapted for deodorizing unpleasant odors. The activated ingredients include activated carbon, carbon fiber, and zeolite, as well as combinations of carbon and zeolite.

An advantage of the present invention is that the filter is removable from and replaceable within the cat litter receptacle so as to facilitate replacement or laundering of said filter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 2:
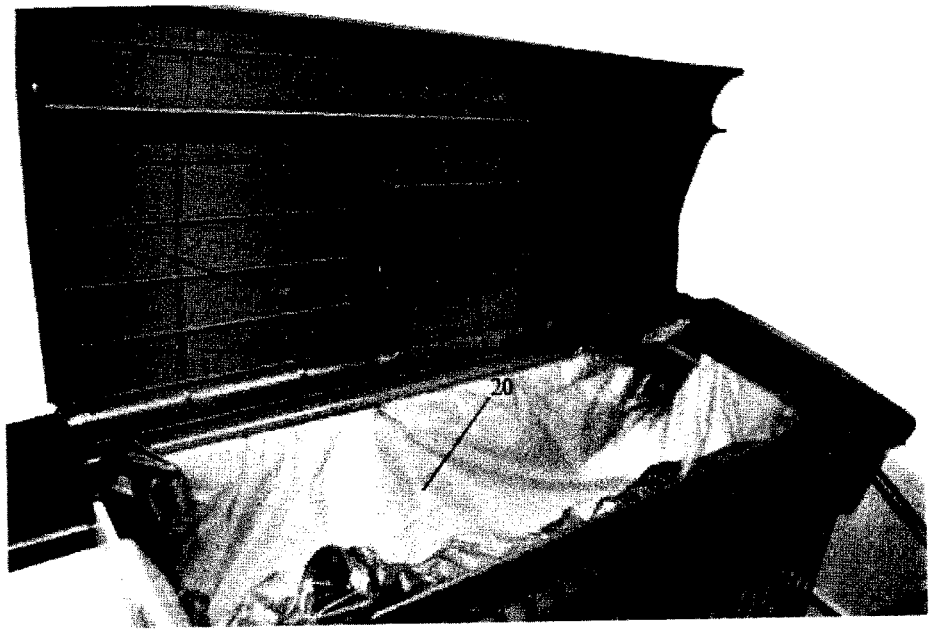
FIG. 2 is a close-up photograph thereof.
Figure 1:
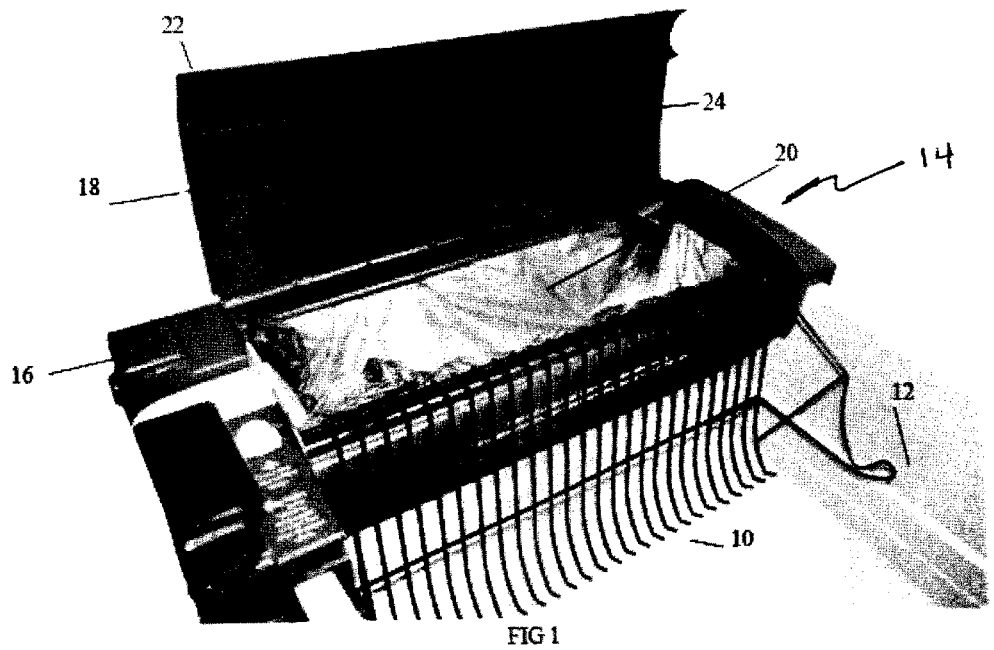
FIG. 1 is a photograph of a partial perspective view of a SMART SCOOP® brand self scooping litter box shown in conjunction with a preferred embodiment of an air filter assembly having a carbon fiber filter according to the present invention.
Figure 3:
FIG. 3 is a close-up photograph thereof, shown having the carbon fiber filter being removed.

Referring now to the drawings, and as indicated in FIG. 1 through FIG. 3, partial perspective view of a SMART SCOOP® brand self scooping litter box 10 is shown for use in conjunction with a preferred embodiment of the present invention. Such a litter box utilizes a litter box 12 forming a waste receiving area that receives a volume of clumping cat litter such as to form clumps upon interacting with animal wastes. The litter box 12 supports a litter box waste receptacle 14 having a housing 16 and a lid or cover 18 that is operatively, hingedly affixed to the housing 18. The housing 16 further contains a removable waste receiving tray 20 within the housing 16 and beneath the cover 18. The cover 18 has an outer surface 22 opposite an inside surface 24. The inside surface 24 forms a filter support structure 30. The support structure 30 forms a filter frame 37 having aligned frame elements extending downward form the inside surface 24 and which circumscribe a filter attachment facet 34.

In conjunction with FIGS. 4-7, an activated filter pad element 50 is shown for use in conjunction with the waste receptacle 18. The filter pad element 50 forms a passive adsorption volume within an outer edge 52 formed of a similar geometric shape to the filter support structure 30, shown herein as a rectangle. Extending from one end of the outer edge 52 is a grasping tab 54 to allow for easy manual manipulation of the filter pad element 50 required for installation onto the filter attachment facet 34.

It would be apparent to a person having ordinary skill in the related art that the filter members 50 could be formed in a variety of shapes or forms with equal efficacy. For instance, the outer edge 52 and the filter frame 32 can each have a circular shape. In another embodiment, the outer edge 52 and the filter frame 32 can each have a polygonal shape. The open face would provide exposure so that the filter 50 could operate most effectively.

Figure 4:
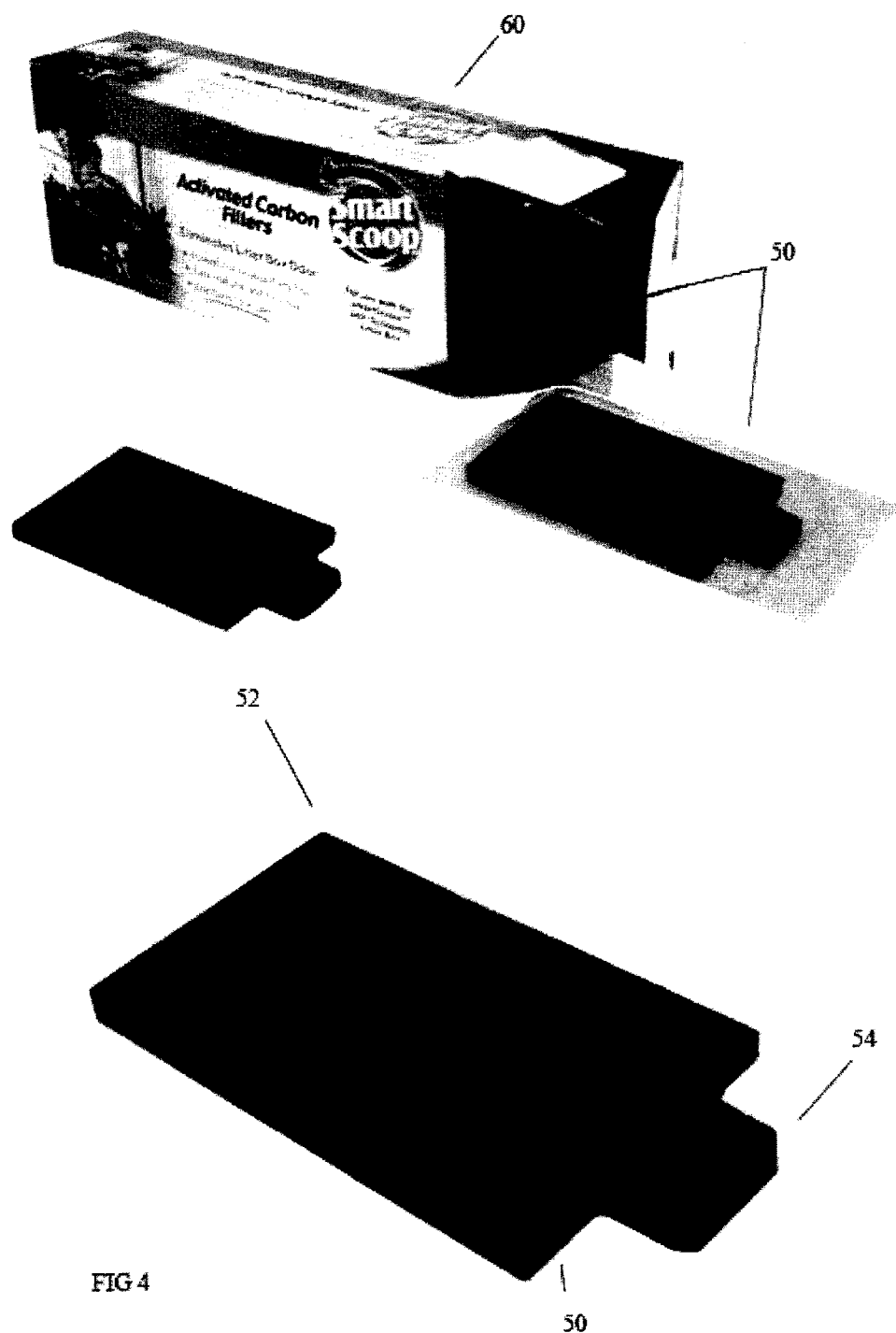
FIG. 4 is a photograph of a perspective view of a package of a plurality of activated carbon filters.

As best shown in conjunction with FIG. 4, a package 60 of a plurality of activated carbon filters 50 are shown. Each individual filter 50 would be sealed or wrapped such as to maintain the odor adsorbing efficacy of the filter 50 while traveling throughout the retail supply chain.

Figure 5:
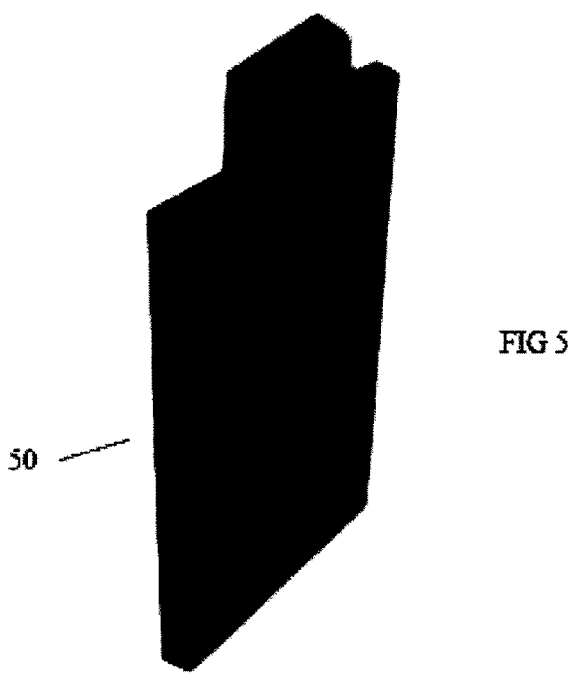
FIG. 5 and FIG. 6 are photographs of an individual activated carbon filters shown in various perspective views.
Figure 7:
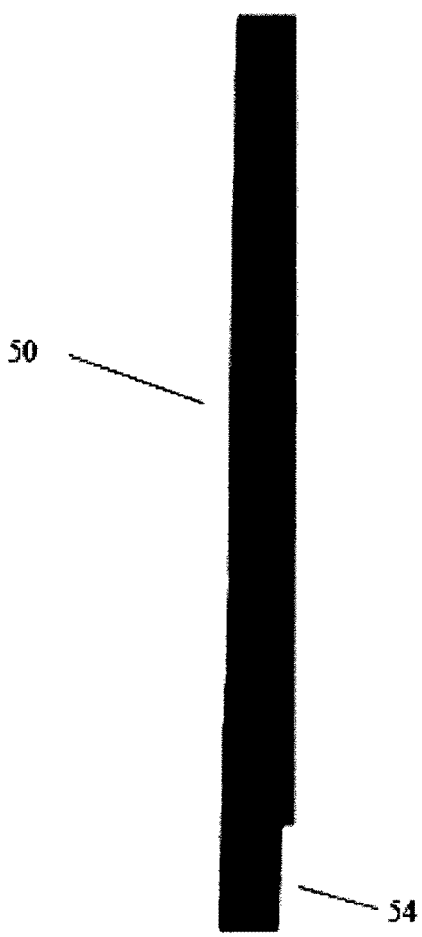
FIG. 7 is a photograph of an individual activated carbon filters shown in a side elevational view.
Figure 6:
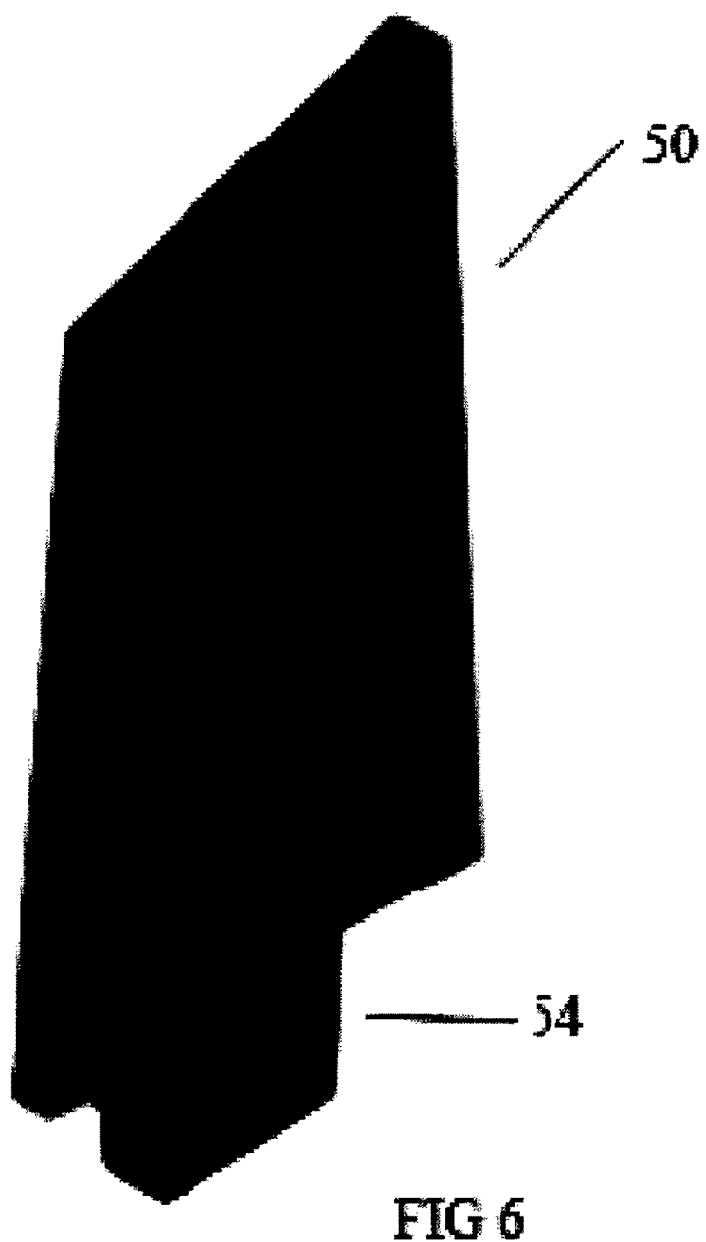

As best shown in conjunction with FIGS. 5-7, the filter 50 comprises a flexible foam planar member formed of open cells into which carbon fibers, zeolite, or other activated ingredients are incorporated during the manufacturing process. Such activated ingredients are specifically adapted for deodorizing unpleasant odors. Additional ingredients can also be added and are also anticipated as being either fragrance or odor masking ingredients as well. In either of the aforementioned embodiments, the filter 50 is a porous structure. Such a filter 50 is anticipated as being washable occasionally without significantly impairing the quality of the filter 50.

It is envisioned that the filter 50 is capable of being formed with a perimeter of a complex shape corresponding to an existing structure for facilitating aftermarket replacement, wherein the air filter assembly 50 of the present invention is exchanged with the original or presently used filter in a pre-existing filter system. The composition and structure of the filter 50 is in accordance with the composition and structure of the filter 50 described above. To manufacture such a filter structure, it is anticipated that an open cell foam is dipped into a slurry of the active ingredients (activated carbon, zeolite, fragrance, scent making, or combination). When dried, this treated open cell foam as a dull gray or black appearance that may not be desirable from a consumer or marketing standpoint. Therefore, it is anticipated that another layer of foam or fabric covering can be laminated thereto in order to provide an aesthetic outward surface that is visually available to the user.

2. Operation of the Preferred Embodiment

To use the present invention, it is envisioned that a self scooping litter box 10 would be used in conjunction with a filter member 50 according to the preferred embodiment of the present invention. The filter 50 is replaceably attached to the support structure 30 by frictionally impinging the filter member 50 within the filter frame 32 and along the filter attachment facet 34.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. In a self scooping litter box forming a waste receiving area that receives a volume of clumping cat litter such as to form clumps upon interacting with animal wastes and a litter box waste receptacle having a housing and a lid or cover that is operatively, hingedly affixed to the housing, the improvement comprising in combination:

a filter member attached to an inside surface of said lid or cover, said filter member having a porous structure incorporating activated ingredients specifically adapted for deodorizing unpleasant odors;

said filter formed of a flexible foam planar member formed of open cells into which activated odor control ingredients are incorporated;

said inside surface forming a filter attachment facet having a filter support structure having aligned frame elements extending downward from said inside surface and which circumscribe a filter attachment facet;

wherein said filter member is compressionally retained within and removable from within said filter attachment facet so as to facilitate laundering of said filter.

2. The improvement of claim 1, wherein said filter member forms a passive adsorption volume within an outer edge formed of a similar geometric shape to said filter support structure.

3. The improvement of claim 2, wherein said filter member further forms a grasping element extending from one end of said outer edge;

wherein said grasping element forms a tab that allows for easy manual manipulation of said filter pad element onto the filter attachment facet.

4. The improvement of claim 1, in combination with a package of a plurality of activated carbon filters members, each individual filter sealed or wrapped such as to maintain the odor adsorbing efficacy of the filter while traveling throughout the retail supply chain.

5. The improvement of claim 2, wherein said filter member comprises a flexible foam planar member formed of open cells into which carbon fibers, zeolite, or other activated ingredients are incorporated.

6. The improvement of claim 2, wherein said filter member comprises an open cell foam treated with a slurry of the activated carbon, zeolite, fragrance, scent making, or combination of activated carbon, zeolite, fragrance, and scent making.

7. The improvement of claim 2, wherein said filter member is formed by the method comprising the steps:

a. Selecting an open cell foam;

b. Dipping aid open cell foam into a slurry of the active ingredients selected from the group consisting of: activated carbon; zeolite; fragrance; scent masking; and any combination thereof;

c. Drying said treated open cell foam;

d. Laminating another layer of foam or fabric covering to provide an aesthetic outward surface that is visually available to the user.

* * * * *